US012759425B2

(12) United States Patent
Lv et al.

(10) Patent No.: US 12,759,425 B2
(45) Date of Patent: Oct. 13, 2026

(54) METHOD FOR MATCHING A VEHICLE AND A CHARGING PILE, METHOD FOR DETERMINING A CHARGING DEVICE BEING ENGAGED WITH A VEHICLE, AND CORRESPONDING APPARATUS

(71) Applicant: Mercedes-Benz Group AG, Stuttgart (DE)

(72) Inventors: Qiaoye Lv, Bejing (CN); Wei Xiao, Bejing (CN); Xiaoxi Xu, Bejing (CN)

(73) Assignee: Mercedes-Benz Group AG, Stuttgart (DE)

( * ) Notice: Subject to any disclaimer, the term of this patent is extended or adjusted under 35 U.S.C. 154(b) by 1249 days.

(21) Appl. No.: 17/641,369

(22) PCT Filed: Sep. 7, 2020

(86) PCT No.: PCT/CN2020/113711
§ 371 (c)(1),
(2) Date: Mar. 8, 2022

(87) PCT Pub. No.: WO2021/047465
PCT Pub. Date: Mar. 18, 2021

(65) Prior Publication Data

US 2024/0042890 A1 Feb. 8, 2024

(30) Foreign Application Priority Data

Sep. 12, 2019 (CN) ......................... 201910863592.2
Aug. 4, 2020 (CN) ......................... 202010771858.3

(51) Int. Cl.
*B60L 53/68* (2019.01)
*B60L 53/65* (2019.01)
*B60L 53/66* (2019.01)

(52) U.S. Cl.
CPC ............... *B60L 53/68* (2019.02); *B60L 53/65* (2019.02); *B60L 53/66* (2019.02); *B60L 2240/72* (2013.01)

(58) Field of Classification Search
CPC .......... B60L 53/68; B60L 53/65; B60L 53/66; B60L 2240/72; B60L 53/14;
(Continued)

(56) References Cited

U.S. PATENT DOCUMENTS 9,180,783 B1 * 11/2015 Penilla .................... B60L 1/003
9,315,109 B2 * 4/2016 Marathe .................. B60L 58/21
(Continued)

FOREIGN PATENT DOCUMENTS

CN 105142964 A 12/2015
CN 105186631 A 12/2015
(Continued)

OTHER PUBLICATIONS

English-language Extended European Search Report issued in European Application No. 208635375-1205 dated Oct. 24, 2023 (18 pages).
(Continued)

*Primary Examiner* — Nha T Nguyen
(74) *Attorney, Agent, or Firm* — Crowell & Moring LLP

(57) ABSTRACT

A method for matching a vehicle and a charging pile includes a) when a user of the vehicle inserts a charging connector of the charging pile into the vehicle, the vehicle sends, to a charging control platform of a cloud, a vehicle location and time stamp information corresponding to a point-in-time when the charging connector is inserted into the vehicle, and b) the charging control platform, after receiving the vehicle location and the time stamp information, scans a status of all charging piles whose distance to the vehicle location is less than a predetermined threshold, and
(Continued)

when it is found through the scan that there was one and only charging pile whose working status is changed from an available status to an occupied but not charging status at the point-in-time, then the vehicle is successfully matched with the charging pile and the charging pile is controlled to start vehicle charging.

9 Claims, 4 Drawing Sheets

(58) Field of Classification Search
CPC ........... B60L 2240/62; B60L 2240/622; B60L 2240/70; B60L 2240/80; B60L 53/31; B60L 53/305; B60L 53/67; Y02T 10/70; Y02T 10/7072; Y02T 90/12; Y02T 90/16; Y02T 90/14; H02J 7/47; H02J 7/50; H02J 7/02; B60Y 2200/91
See application file for complete search history.

(56) References Cited

U.S. PATENT DOCUMENTS

| | | | | |
|---|---|---|---|---|
| 2008/0040479 | A1 | 2/2008 | Bridge et al. | |
| 2009/0251300 | A1 | 10/2009 | Yasuda et al. | |
| 2012/0123670 | A1 | 5/2012 | Uyeki | |
| 2013/0110296 | A1* | 5/2013 | Khoo | G06Q 30/0283 700/286 |
| 2014/0089016 | A1* | 3/2014 | Smullin | G06Q 10/02 705/5 |
| 2015/0202974 | A1* | 7/2015 | Rub | B60L 53/31 320/109 |
| 2016/0075242 | A1* | 3/2016 | Kim | B60L 53/62 320/109 |
| 2016/0274157 | A1* | 9/2016 | Shah | B60L 53/31 |
| 2016/0332527 | A1* | 11/2016 | North | H02J 3/003 |
| 2017/0274791 | A1* | 9/2017 | Lee | B60L 53/62 |
| 2018/0012497 | A1 | 1/2018 | Penilla et al. | |
| 2018/0111494 | A1 | 4/2018 | Penilla et al. | |
| 2018/0147950 | A1* | 5/2018 | Nakano | B60L 53/14 |
| 2019/0118665 | A1* | 4/2019 | Mizutani | B60L 53/67 |
| 2019/0128684 | A1 | 5/2019 | Mizutani et al. | |
| 2019/0217718 | A1* | 7/2019 | Arregui Torres | B60L 53/35 |
| 2019/0225107 | A1* | 7/2019 | Morizono | H02J 13/13 |
| 2019/0275910 | A1* | 9/2019 | Inoue | B60L 55/00 |
| 2019/0283623 | A1* | 9/2019 | Takebayashi | B60R 21/01512 |
| 2025/0112475 | A1* | 4/2025 | Malik | B60L 53/16 |

FOREIGN PATENT DOCUMENTS

| | | | |
|---|---|---|---|
| CN | 105450623 | A | 3/2016 |
| CN | 106274539 | A | 1/2017 |
| CN | 106385070 | A | 2/2017 |
| CN | 107221973 | A | 9/2017 |
| CN | 107571749 | A | 1/2018 |
| CN | 107696888 | A | 2/2018 |
| CN | 207291701 | U | 5/2018 |
| CN | 108973750 | A | 12/2018 |
| CN | 109017344 | A | 12/2018 |
| CN | 109050316 | A | 12/2018 |
| CN | 109228898 | A | 1/2019 |
| CN | 109866648 | A | 6/2019 |
| CN | 109903466 | A | 6/2019 |
| CN | 110081900 | A | 8/2019 |
| CN | 110539662 | A | 12/2019 |
| EP | 2 537 224 | B1 | 12/2012 |
| EP | 2 985 172 | A1 | 2/2016 |
| JP | 2010-231258 | A | 10/2010 |
| JP | 2011-237406 | A | 11/2011 |
| JP | 2013-106391 | A | 5/2013 |
| JP | 2013-118760 | A | 6/2013 |
| JP | 2014-45574 | A | 3/2014 |
| JP | 2019-96058 | A | 6/2019 |
| JP | 2019-97355 | A | 6/2019 |

OTHER PUBLICATIONS

English-language European Communication issued in European Application No. 208635375-1205 dated Nov. 10, 2023 (1 page).
PCT/CN2020/113711, International Search Report dated Dec. 9, 2020 (Three (3) pages).
Chinese-language Chinese Office Action issued in Chinese application No. 201910863592.2 dated Oct. 10, 2022 (Eight (8) pages).
Chinese-language Chinese Office Action issued in Chinese application No. 202080063413.8 dated Jul. 29, 2023 (Nine (9) pages).
Japanese Office Action issued in Japanese application No. 2022-515982 dated May 31, 2023, with partial English translation (Seven (7) pages).
English-language Supplemental European Search Report issued in European application No. 20863537.5-1205 dated Jul. 27, 2023 (Sixteen (16) pages).
English machine translation of B8, which was previously cited on Jan. 11, 2023 (Nine (9) pages).
Korean-language Office Action issued in Korean Application No. 10-2022-7012053 dated Sep. 30, 2024 (4 pages).
Japanese-language Japanese Office Action issued in Japanese Application No. 2022-515982 dated Dec. 5, 2023 (3 pages).
Korean-language Korean Office Action issued in Korean Application No. 10-2022-7012053 dated Feb. 21, 2024 (7 pages).
English-language Extended European Search Report issued in European Application No. 251515672-1201 / 4570578 dated Jun. 2, 2025 (11 pages).
English-language European Communication issued in European Application No. 20 863 537.5-1201 dated Feb. 5, 2025 (7 pages).

* cited by examiner

METHOD FOR MATCHING A VEHICLE AND A CHARGING PILE, METHOD FOR DETERMINING A CHARGING DEVICE BEING ENGAGED WITH A VEHICLE, AND CORRESPONDING APPARATUS

BACKGROUND AND SUMMARY OF THE INVENTION

This disclosure relates to a method for matching a vehicle and a charging pile and a method for determining a charging device that is being physically engaged with a vehicle in interest. The disclosure further relates to an apparatus for determining a charging device that is being physically engaged with a vehicle in interest, a corresponding vehicle-side device, and a corresponding charging device-side device.

Currently, users of electric vehicles need to perform many active operations when charging electric vehicles. For example, when an electric vehicle intends to be charged at a charging pile, the user of the electric vehicle has to scan the two-dimensional code of the charging pile to match the electric vehicle with the charging pile. This is because in the current process of charging the electric vehicle through the charging pile, there is no available communication channel between the electric vehicle and the charging pile. Without the process of scanning the two-dimensional code by the user, it is impossible to inform the application of the electric vehicle of which specific charging pile is to be used for charging or to inform the charging pile of which specific electric vehicle is being charged. However, such a pile-activating process is not only troublesome but also time-consuming for users.

Therefore, it is expected to provide a simple and efficient way to activate charging piles.

The object of the disclosure is achieved by providing a method for determining a charging device that is being physically engaged with a vehicle in interest, the method at least comprising the following steps:

a') after the charging device is physically engaged with the vehicle in interest, at least one primary candidate charging device is selected based on a current geographic location of the vehicle in interest; and b') from the at least one primary candidate charging device, a secondary candidate charging device that is possibly being engaged with the vehicle in interest is selected according to screening conditions related to an operating status of the charging device.

According to an optional embodiment, the screening condition met by the secondary candidate charging device is that it is changed from an available status to a status of being physically engaged but not activated to charge at a point-in-time of physical engagement with the vehicle in interest.

According to an optional embodiment, whether the charging device satisfies the screening condition is determined in the following manner: the charging device has an available status as the latest history status recorded before the point-in-time and is in a status of being physically engaged but not activated to charge after the point-in-time.

According to an optional embodiment, the number of the secondary candidate charging devices is counted and, if the number is equal to 1, the only secondary candidate charging device is activated to start a charging process, and if the number is not equal to 1, it is deemed that it failed to determine the charging device that is being physically engaged with the vehicle in interest.

According to another aspect, the object of the disclosure is further achieved by a method for determining a charging device that is being physically engaged with a vehicle in interest, the method at least comprising the following steps:

a) after the charging device is physically engaged with the vehicle in interest, at least one primary candidate charging device is selected based on a current geographic location of the vehicle in interest; and b) from the at least one primary candidate charging device, a secondary candidate charging device that is possibly being physically engaged with the vehicle in interest is selected type by type according to screening conditions that vary with a type of the charging device, wherein the type of the charging device is determined based on an ability of the charging device in expressing that the charging device is in a status of being physically engaged but not activated to charge.

According to an optional embodiment, charging devices which can directly generate status information indicating that it is in a status of being physically engaged but not activated to charge are pre-marked as a first type of charging devices, and step b) comprises: selecting, from the first type of the at least one primary candidate charging device, those charging devices, which meet the following condition, as the first type of secondary candidate charging devices: they have an available status as the latest history status recorded before a point-in-time when the vehicle in interest is physically engaged, and are in a status of being physically engaged but not activated to charge after the point-in-time.

According to an optional embodiment, charging devices which cannot directly generate the status information but support a pre-start operation are pre-marked as a second type of charging devices, and step b) comprises:

b1) performing the pre-start operation in those of the second type of the at least one primary candidate charging devices which have the available status as the latest history status; and b2) screening out the charging devices, which make a specific response to the pre-start operation, as the second type of secondary candidate charging devices, wherein the specific response indirectly indicates that the charging devices are in a status of being physically engaged but not activated to charge.

According to an optional embodiment, the numbers of the first and second types of secondary candidate charging devices are counted respectively, and these two numbers are summed. If the sum is equal to 1, then the only secondary candidate charging device is activated to start the charging process, and if the sum is greater than 1, then it is deemed that it failed to determine the charging device that is being physically engaged with the vehicle in interest.

According to an optional embodiment, if the sum is equal to zero, counting the number of remaining charging devices in the primary candidate charging devices except the first and second types of charging devices. If the number is equal to 1, the only remaining primary candidate charging device is activated to start the charging process; otherwise, it is deemed that it failed to determine the charging device that is being physically engaged with the vehicle in interest.

According to an optional embodiment, charging devices that can neither directly generate the status information nor support the pre-start operation are pre-marked as a third type of charging devices, and step b) comprises: counting the numbers of the first and second types of secondary candidate charging devices respectively, and the number of the third type of primary candidate charging devices, and summing these three numbers. If the sum is equal to 1, the only secondary candidate charging device or the only third type of primary candidate charging device is activated to start the charging process; otherwise, it is deemed that it failed to determine the charging device that is being physically engaged with the vehicle in interest.

According to an optional embodiment, after the selected charging devices are activated, a posterior procedure is executed, which comprises at least the following step: c) confirming whether the start of charging is detected at a side of the vehicle; if not, stopping the charging process of the activated charging device.

According to an optional embodiment, if it fails to determine the charging device that is being physically engaged with the vehicle in interest and/or the activated charging device is stopped in step c), the user is notified that the automatic matching failed and a manual matching is required to start the charging process.

According to another aspect, the object of the present invention is achieved by a method for matching a vehicle and a charging pile, the method comprising:

- a") when a user of the vehicle inserts a charging connector of the charging pile into the vehicle, the vehicle sends, to a charging control platform of a cloud, a current vehicle location and time stamp information corresponding to a point-in-time when the charging connector is inserted into the vehicle;
- b") the charging control platform, after receiving the vehicle location and the time stamp information, scans a status of all charging piles whose distance to the vehicle location is less than a predetermined threshold. If it is found through the scanning that there is one and only charging pile whose working status is changed from an available status to an occupied but not charging status at the point-in-time corresponding to the time stamp, then the vehicle is successfully matched with the charging pile and the charging pile is controlled to start charging the vehicle.

According to an optional embodiment, if it is found through the scanning that there is no or multiple charging piles whose working status is changed from the available status to the occupied but not charging status at the point-in-time corresponding to the time stamp, then it is deemed that the matching fails.

According to an optional embodiment, after the matching fails, the user of the vehicle is notified to scan the two-dimensional code for charging.

According to an optional embodiment, after the matching fails, the user is provided with a list of all charging piles around the vehicle through a human-computer interaction interface of the vehicle or a smart phone, so that the user can select the charging pile that is charging the vehicle.

According to an optional embodiment, the vehicle location is a GPS location of the vehicle.

According to an optional embodiment, the predetermined threshold is 800 meters.

According to a further aspect, the object of the disclosure is achieved by an apparatus for determining a charging device that is being physically engaged with a vehicle in interest, the apparatus comprising a processor and a computer-readable storage medium communicatively connected with the processor, in which medium a computer program is stored, and when the computer program is executed by the processor, the method according to any one of the preceding claims is performed, wherein the apparatus is particularly configured as a server which is communicatively connected with a vehicle-side device and a charging device-side device, the server is particularly configured to determine, based on historical information of the charging devices, ability levels of the charging devices in expressing that the charging devices are in the status of being physically engaged but not activated to charge, and the determined ability levels are stored as an attribute assigned to the respective charging devices.

According to another aspect, the object of the disclosure is achieved by a vehicle-side device communicatively connected with the apparatus, wherein the vehicle-side device is configured to send a current geographic location of the vehicle to the apparatus upon the vehicle being physically engaged with the charging device.

According to another aspect, the object of the disclosure is achieved by a charging device-side device communicatively connected with the apparatus, wherein the charging device-side device is configured to send a real-time operating status of the charging device to the apparatus, wherein the real-time operating status comprises an available status, a charging status, and a status of being physically engaged but not activated to charge.

The embodiments of the disclosure at least have the following advantages: in this disclosure, the vehicle and the charging pile are matched according to the current vehicle location and the time stamp information corresponding to the point-in-time when the charging connector is inserted into the vehicle, which enables the user of the vehicle to complete the charging without the need of scanning the two-dimensional code of the charging pile, simplifies the active operations of the user during the charging process, and saves the time required for charging preparation.

This disclosure realizes the effect of: liberating users from complicated matching steps, and enabling the operation manner of "plug and charge", thereby bringing great convenience to users.

Further advantages and beneficial embodiments of the subject matter of the disclosure are apparent from the description, the accompanying drawings and the claims.

More features and advantages of the disclosure can be further explained by the following detailed description of specific embodiments with reference to the accompanying drawings.

DETAILED DESCRIPTION OF THE DRAWINGS

In order to have a clearer understanding of the technical problems to be solve, the technical solutions, and the beneficial technical effects of the disclosure, the disclosure will be further described in detail below with reference to the accompanying drawings and a number of exemplary embodiments. It should be understood that the specific embodiments described here are only for the purpose of explaining the disclosure, rather than limiting the scope of protection of the disclosure. In the accompany drawings, the same or similar reference signs refer to the same or equivalent components.

Figure 1:
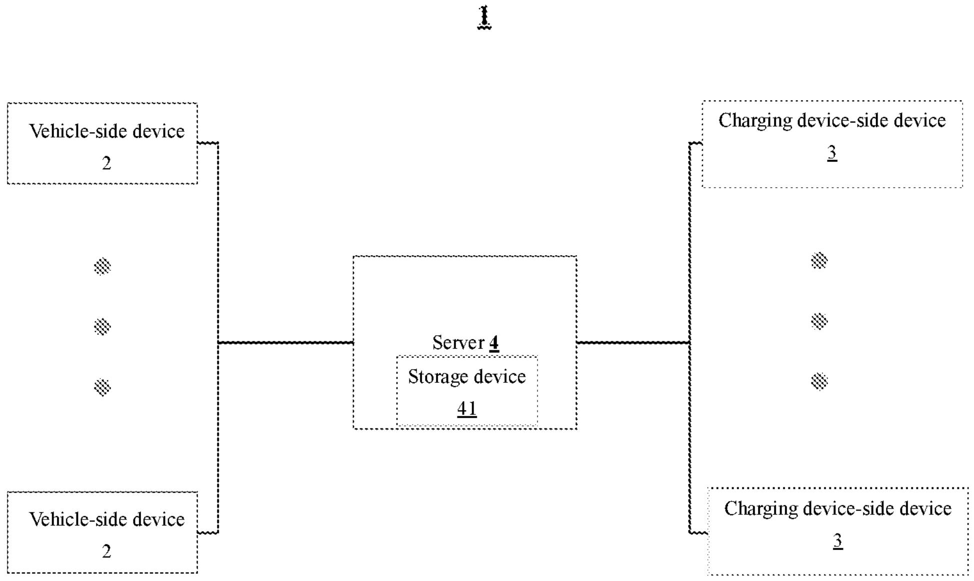
FIG. 1 shows a schematic structural block diagram of a system for determining a charging device that is being physically engaged with a vehicle in interest according to an exemplary embodiment of the disclosure.

FIG. 1 shows a schematic structural block diagram of a system 1 for determining a charging device that is being physically engaged with a vehicle in interest according to an exemplary embodiment of the disclosure. The system 1 comprises at least one vehicle-side device 2, at least one charging device-side device 3, and a server 4 communicatively connected with the vehicle-side device 2 and the charging device-side device 3. The vehicle-side device 2 is configured to send at least one of the following types of information to the server 4 after a corresponding vehicle is physically engaged with one charging device: a real-time geographic location, a time of engagement, and a type of an engaged charging interface (for example, AC/DC), etc. The charging device-side device 3 is configured to send at least one of the following types of information to the server 4: identity information, location information, operating status information (such as an available status, a charging status, or possibly a status of being physically engaged but not activated to charge), interface type information (for example, AC/DC), etc. The server 4 includes a storage device 41 that stores a variety of information including the above-mentioned information collected from the vehicle-side device 2 and the charging device-side device 3 within a time span, for example, in the past year. In one exemplary embodiment, a database is established at least based on the information collected from the charging device-side device 3 to enable query, retrieval, update, modification, addition and deletion of charging device information.

In an exemplary embodiment, in one aspect, the server 4 may passively receive and then store information including history status data of the charging device that is fed by the charging device-side device 3 periodically (for example, at a time interval of 1-10 seconds), so as to use it, for example, in steps S30 and S30' for determining the latest history status of the charging device (see explanation below). In a further aspect, the server 4 may actively capture a real-time status of the charging device by sending a data acquisition request to the charging device-side device 3, for example, as performed in step S21 explained below.

In particular, the server 4 is configured to determine, based on the history status information of the charging devices, ability levels of the charging devices in expressing that the charging devices are in the status of being physically engaged but not activated to charge, and pre-store the determined ability levels as an attribute assigned to the respective charging devices.

For the convenience of presentation, in the context of this description, the status of being physically engaged but not activated to charge of the charging device is also referred to as "intermediate status". Accordingly, the status information corresponding to such a status generated by the charging device is also referred to as "intermediate status information".

Figure 2:
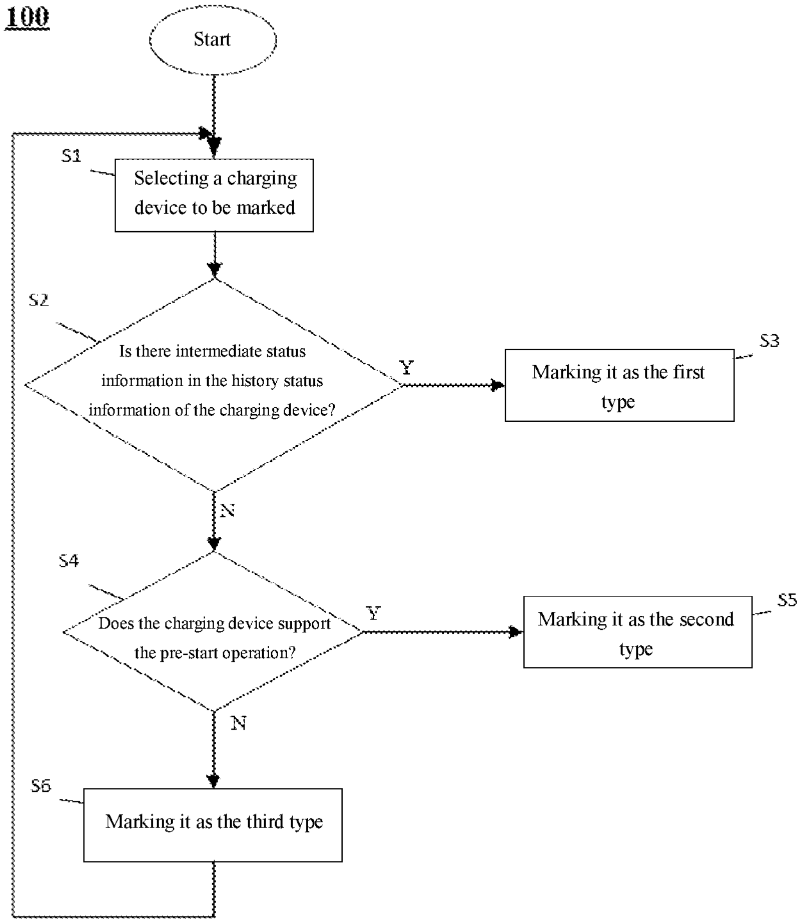
FIG. 2 shows a flowchart of a method for determining a type of a charging device according to an exemplary embodiment of the disclosure.

FIG. 2 shows a flowchart of a method 100 for determining a type of a charging device associated with the ability level according to an exemplary embodiment of the disclosure.

In step S1, one charging device is selected as the charging device to be marked.

In step S2, whether there is status information of being physically engaged but not activated to charge, that is, the intermediate status information, in the history status information of the charging device within a past time span (for example, in the past six months or longer) is determined.

If there is intermediate status information, it means that the charging device is capable of directly generating intermediate status information to directly express that it is in the intermediate status. In this case, in step S3, the charging device is marked as a first type representing a high ability level.

In another case, if there is no intermediate status information in the history status information of the charging device, then in step S4, whether it supports a pre-start operation is determined based on its historical information (see the explanation below). If it supports, it means that although the charging device cannot directly generate the intermediate status information, it can indirectly express that it is in the intermediate status by responding to the pre-start operation (for example, generating a specific error code). In this case, in step S5, it is marked as a second type representing a middle ability level.

On the contrary, if the charging device does not support the pre-start operation, in step S6, it is marked as a third type representing a low ability level, since the charging device can neither directly generate intermediate status information nor respond to the pre-start operation to indirectly express that it is in the intermediate status.

After completing the type marking of the charging device, the above process is repeated until the type marking for all the charging devices is completed.

In addition, the type marking of charging devices may be updated based on newly collected charging device information.

Figure 3:
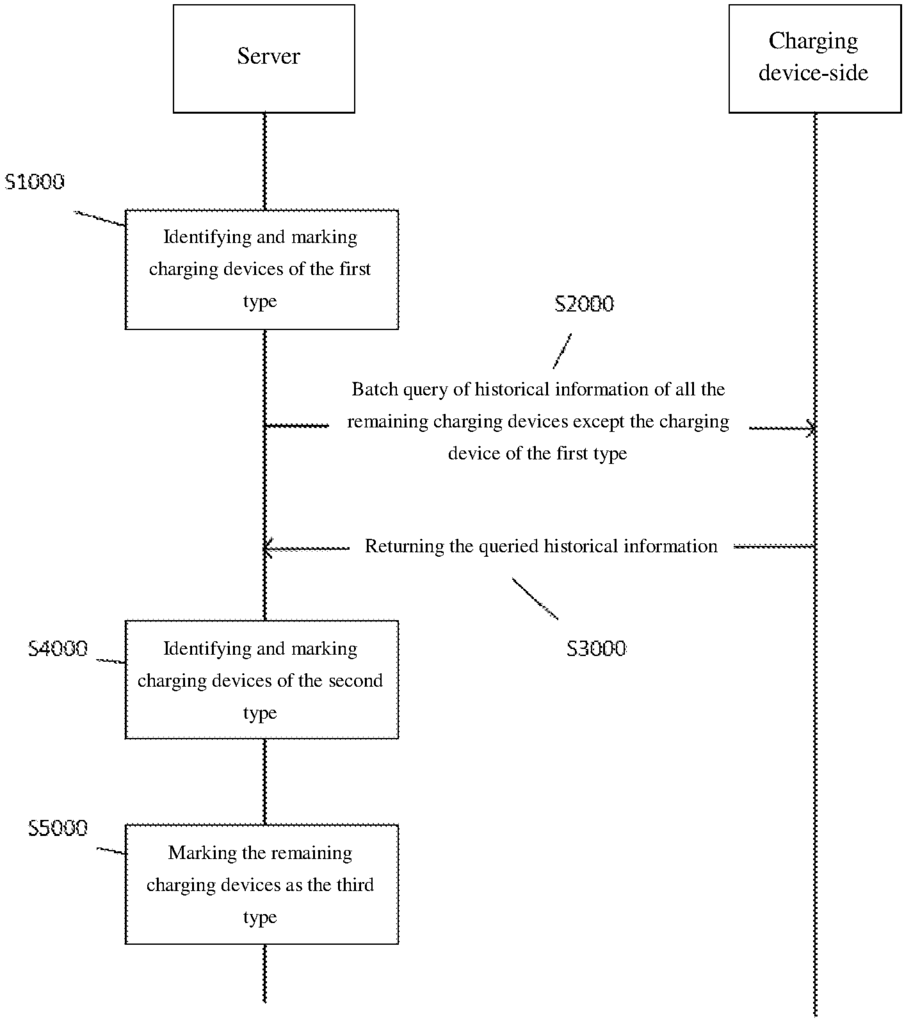
FIG. 3 shows an exemplary way of implementing a method of the disclosure with a server in a system flowchart.

FIG. 3 shows an exemplary way of implementing the method 100 with the server 4 in a system flowchart.

In step S1000, at the server 4, the charging devices of the first type are identified by querying the history status information of each charging device recorded in the storage device 41 and the types of these charging devices are stored. For the remaining charging devices that are not marked as the first type in this step, in step S2000, a request for batch query of historical information of all these remaining charging devices in a past period of time is sent by the server 4 to the charging device-side device 3. In step S3000, a query result is returned by the charging device-side device 3 in response to the request. Next, in step S4000, based on the returned query result, the charging devices that support the pre-start operation are identified and marked as the second type. For the rest of the remaining charging devices that are not marked as the second type, for example, the charging devices that have not returned any query result or have failed to be determined to support the pre-start operation based on the returned query result, in step S5000, those charging devices are marked as the third type. In this way, all the charging devices registered at the server 4 are pre-marked with a specific type for a subsequent screening in order to match the vehicle with the charging device.

Exemplarily, type tags are stored in association with the identity information of the charging devices in the aforementioned database.

Figure 4:
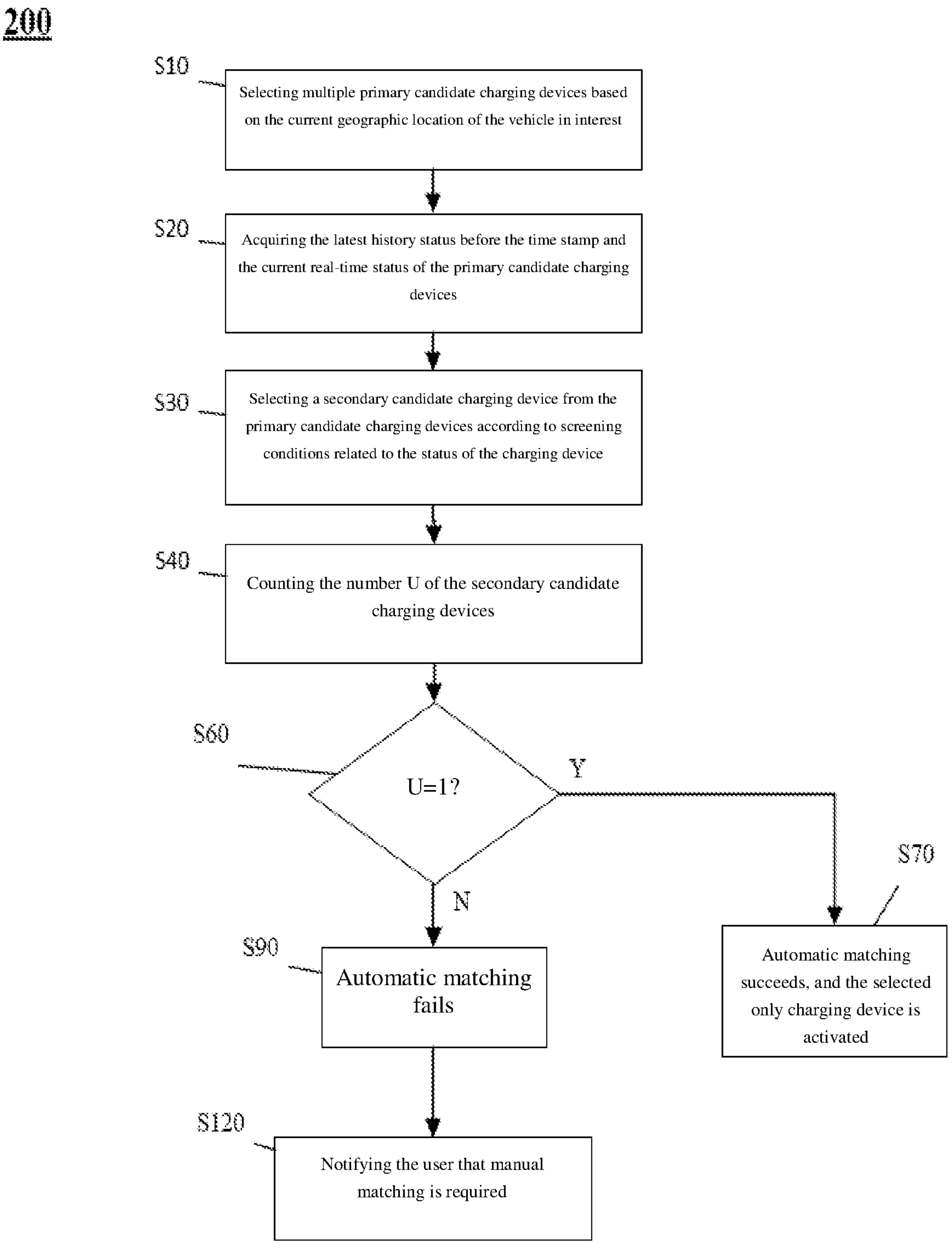
FIG. 4 shows a flowchart of a method for determining a charging device that is being physically engaged with a vehicle in interest according to an exemplary embodiment of the disclosure.

FIG. 4 shows a flowchart of a method 200 for determining a charging device that is being physically engaged with a vehicle in interest according to an exemplary embodiment of the disclosure. As shown in FIG. 4, in step S10, after a charging device is physically engaged with the vehicle in interest, at least one, in particular multiple charging devices are selected as the primary candidate charging devices based on a current geographic location of the vehicle in interest.

According to an exemplary embodiment, the charging device is configured as a charging pile with a charging gun, in particular a public charging pile, and accordingly, the physical engagement corresponds to inserting a charging connector of the charging gun into a charging interface of the vehicle. Also, the physical engagement of the charging device with the vehicle may be performed manually, partially automatically, or fully automatically.

According to an exemplary embodiment, step S10 includes the following steps: step S11, after the physical engagement of the charging device with the vehicle in interest is completed, sending the current geographic location (for example, GPS data) of the vehicle and optionally the type of the engaged charging interface by the vehicle-side device 2 internally built in the vehicle in interest to the server 4;

step S12, delimiting, by the server 4, a geographic range by using the current geographic location of the vehicle in interest as a reference point, and selecting all charging devices located in the geographic range as the primary candidate charging devices. The geographic range should be delimited to be large enough to tolerate positioning errors of the vehicle and the charging devices in order to necessarily include the charging device physically engaged with the vehicle in interest. In one embodiment, all charging devices having a distance to the current geographic location of the vehicle in interest being within a preset threshold, for example, 500 meters or 800 meters, are selected as primary candidate charging devices. Preferably, based on the current geographic location of the vehicle, the charging device being closest to the geographic location is searched first, and then the current geographic location is taken as a center to delimit a circle with a radius R=r1+r2 as the geographic range, wherein r1 is the distance between the closest charging device and the current geographic location, which varies according to the actual searching situation, and r2 is a preset expansion radius to avoid missing the right charging device.

In another example, if the positioning data of the vehicle shows that it is in a parking lot or a geofence, all charging devices in the parking lot or the geofence are selected as primary candidate charging devices.

Next, in step S30, from the at least one primary candidate charging device, a secondary candidate charging device that is possibly being engaged with the vehicle in interest is screened out according to screening conditions related to an operating status of the charging device. In one exemplary embodiment, the screening condition met by the secondary candidate charging device is that it is changed from an available status to a status of being physically engaged but not activated to charge at a specific time stamp, wherein the time stamp corresponds to a point-in-time when the charging device is physically engaged with the vehicle in interest.

According to an exemplary embodiment of the disclosure, the following method is adopted to determine whether the charging device satisfies the screening condition: the charging device has an available status as the latest history status recorded before the time stamp and is in a status of being physically engaged but not activated to charge after the time stamp.

To this end, preferably, step S20 is performed before step S30: acquiring the latest history status of the at least one primary candidate charging device before the time stamp and their current real-time statues. To this end, as an example, the server 4 may send a data acquisition request to the charging device-side device 3 to retrieve data about the real-time status and optionally the latest history status, as performed in step S21. Additionally or alternatively, the latest history status may be acquired by accessing the database, as the charging device side-device 3 always sends relevant data to the server 4 immediately or periodically (for example, at a time interval of 1-10 seconds). In this case, in particular, only the latest history status with an occurrence time from the time stamp being less than a preset time threshold can be used as a valid latest history status for implementing step S30, and also S30', S31 and S32 explained below, since if the latest history status recorded in the server 4 occurs prematurely, it is probably because the true latest history status of the charging device is not fed back to the server 4 for technical reasons such as the network, the hardware infrastructure, etc. Preferably, the preset time threshold is set to be no shorter than the time interval at which the charging device-side device 3 actively and periodically feeds status data to the server 4. According to an exemplary embodiment, a point-in-time when the server 4 receives the current geographic location from the vehicle-side device may be regarded as the time stamp. Alternatively, the point-in-time when the charging device is engaged with the vehicle in interest recorded by the vehicle-side device may be sent to the server 4 for use as the time stamp. In this case, it may be necessary to synchronize clocks of the server 4, the vehicle-side device 2 and the charging device-side device 3.

Next, in step S40, a number U of the secondary candidate charging devices that have been screened out in step S30 is counted. If the number U is exactly equal to 1, it is deemed that the only secondary candidate charging device is exactly the charging device that is physically engaged with the vehicle in interest, and then the charging process of the only secondary candidate charging device is activated. If the number U is not equal to 1, for example, U is greater than 1 or equal to zero, then it is deemed that the charging device that is being physically engaged with the vehicle in interest has not been successfully determined. In this case, in step S120, the user may be notified that the automatic matching failed and that the user needs to manually match the charging device, for example, by scanning a two-dimensional code.

Alternatively, after failure of the automatic matching, the user may be provided with a list of all charging piles around the vehicle through a human-computer interaction interface of the vehicle or a smart phone, so that the user can select the charging pile to which the vehicle if connected.

Figure 5:
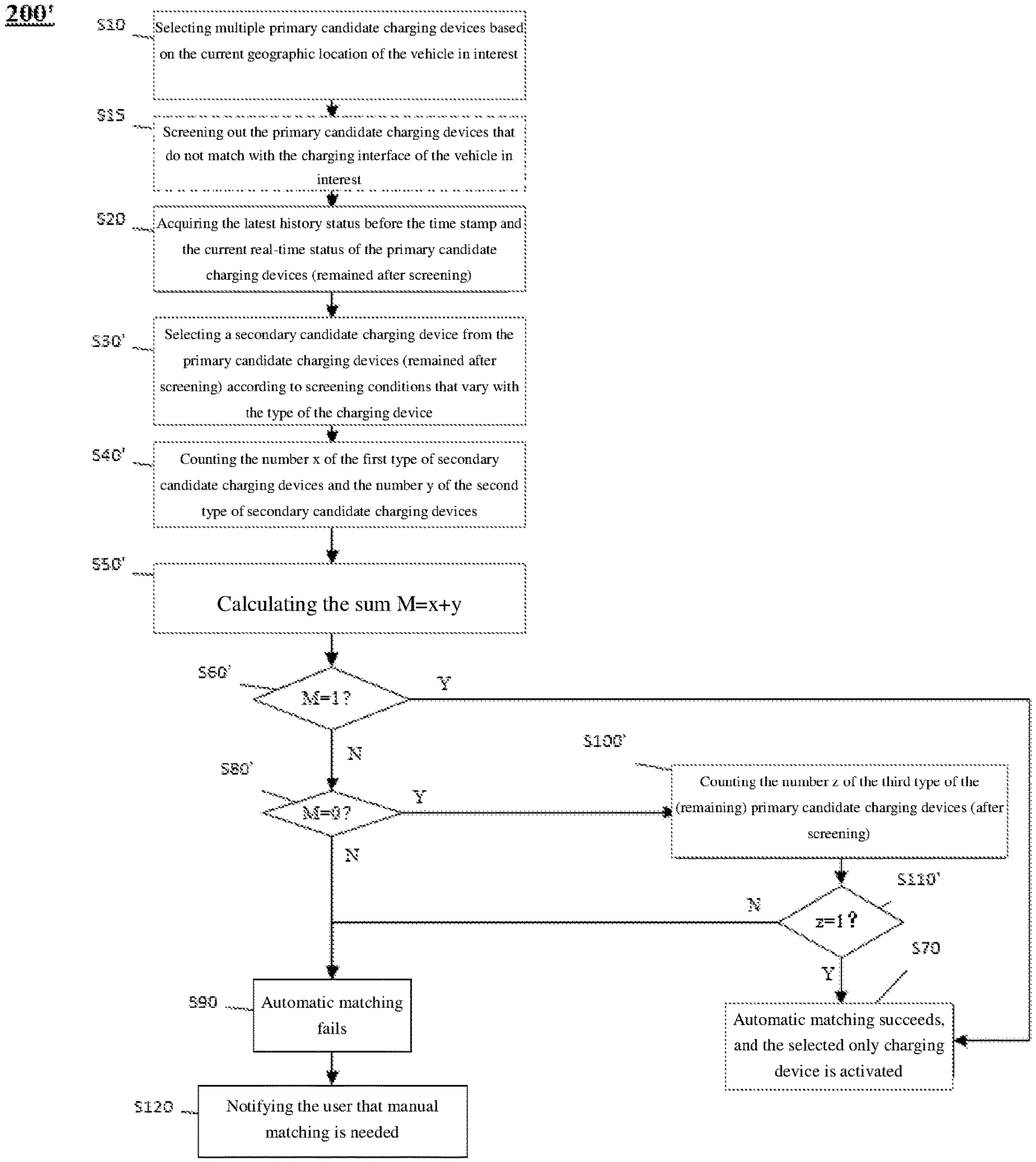
FIG. 5 shows a flowchart of a method for determining a charging device that is being physically engaged with a vehicle in interest according to another exemplary embodiment of the disclosure.

FIG. 5 shows a flowchart of a method 200' for determining a charging device that is being physically engaged with a vehicle in interest according to another exemplary embodiment of the disclosure. The steps of the method 200' that are same with the steps of method 200 are represented by the same reference signs S10, S20, S70, S90 and S120. For these same steps, reference can be made to the description above in conjunction with FIG. 4. No more details will be elaborated here.

In step S30', from the at least one primary candidate charging device, a secondary candidate charging device that is possibly being physically engaged with the vehicle in interest is selected type by type according to screening conditions that vary with the type of the charging device, wherein, as explained above, the type of the charging device is determined based on the ability of the charging device in expressing that the charging device is in a status of being physically engaged but not activated to charge, and it includes the following three types: a first type capable of directly generating an intermediate status information indicating that the charging device is in a status of being physically engaged but not activated to charge, a second type incapable of directly generating the intermediate status information but capable of supporting a pre-start operation, and a third type capable of neither generating the intermediate status information nor supporting the pre-start operation.

Step S30' includes: in step S31, from the first type of the at least one primary candidate charging device, screening out secondary candidate charging devices of the first type according to a first screening condition associated with the first type, wherein the first screening condition is: having a status change from the available status to the status of being physically engaged but not activated to charge at the time stamp corresponding to the point-in-time when the charging device is physically engaged with the vehicle in interest. In one embodiment, step S31 is implemented as follows: from the first type of the at least one primary candidate charging device, screening out charging devices that meet the following condition as the secondary candidate charging devices: having the available status as the latest history status before the time stamp and having a current real-time status of being physically engaged but not activated to charge.

In step S32, from the second type of the at least one primary candidate charging device, screening out secondary candidate charging devices of the second type according to a second screening condition associated with the second type, wherein the second screening condition is: the charging device having the available status as the latest history status, and being capable of making a specific response to an instant pre-start operation. This specific response indirectly indicates that the charging device is currently in the intermediate status. The specific response includes, for example, returning a specific error code.

To be specific, step S32 may include: in step S321, from the second type of the at least one primary candidate charging device, screening out the charging devices having the available status as the latest history status; in step S322, performing the pre-start operation in the charging device screened out in step S321 and then further screening out the charging devices that make a specific response to the pre-start operation as the second type of secondary candidate charging devices.

Additionally, step S321' may be optionally performed between step S321 and step S322: determining whether the number of the charging devices having the available status as the latest history status among the second type of primary candidate charging devices is greater than a preset threshold, and implementing step S322 only if the number is not greater than a preset threshold. If the number exceeds the preset threshold, skip to step S90 (also shown in FIG. 4-FIG. 5) to request the user to perform manual matching, since performing the pre-start operation on an excessive number of charging devices will bring a considerable amount of workload, which causes significant burden and loss to the charging devices. Exemplarily, the preset threshold is, for example, hundreds, such as 500 or more.

Further, the pre-start operation may be exemplarily performed as follows: causing the charging device to temporarily deliver a small current to the vehicle, and monitoring an electrical status of a circuit in the charging connector of the charging device when the current is sent. If the electrical status indicates that the charging connector is electrically connected to the vehicle-side charging interface, it means that the charging device has been physically engaged with the vehicle. Accordingly, such an electrical status corresponds to the specific response indicating that the charging device is in the intermediate status. In addition, any suitable operation capable of detecting whether the charging device is in the intermediate status that can be conceived by the skilled in the art is within the range of the pre-start operation of this disclosure.

In step S40', a number x of the first type of secondary candidate charging devices screened out in step S31 and a number y of the second type of secondary candidate charging devices screened out in step S32 are counted. In step S50', a sum of the two numbers M=x+y are calculated. Next, in step S60', whether the sum M is equal to 1, and if it is exactly equal to 1, are determined; then in step S70, it is deemed that the charging device that is being physically engaged with the vehicle in interest has been successfully found, and the charging process of the charging device is activated, thereby achieving the charging manner of "plug and charge". If the sum is not equal to 1, then in step S80', whether M is equal to zero is further determined. If it is not equal to zero, that is, M is greater than 1, it is deemed that the charging device that is being physically engaged with the vehicle in interest has not been successfully found (S90). On the contrary, if it is equal to zero, then in step S100', a number z of the third type of the at least one primary candidate charging device is counted, and in step S110', whether z is exactly equal to 1 is determined, and if so, the automatic matching succeeds (S70); otherwise, the automatic matching fails (S90), and skip to step S120 above.

In the method 200' according to the disclosure, it is determined that the matching is successful if the sum of the numbers of the first and second types of secondary candidate charging devices is equal to 1, without taking the third type of charging devices into consideration. This is a trade-off between the accuracy of automatic pile activation and the average pile activation calculation rate. In practice, the number of the third type of charging devices is quite limited, which means the probability that the vehicle in interest is connected exactly to one of the limited numbers is extremely low. Therefore, conditionally ignoring the third type of charging devices can effectively shorten the average calculation time for each pile activation without actually impairing the accuracy of automatic pile-activation. Even, in an alternative embodiment, steps S80', S100' and S110' can be omitted, and if M is not equal to 1, the pile activation-matching is directly deemed failed, thereby simplifying the pile activation calculation process.

In addition, by comparing the method 200 shown in FIG. 4 with the method 200' shown in FIG. 5, it can be seen that the method 200' of FIG. 5 has the following advantageous features: the method 200' takes account of the fact that not all the charging devices can provide the intermediate status information in practice, and thus performs a special pre-classification of the charging devices to adopt a type-by-type screening method, so as to cover all types of charging devices on the market, thereby notably improving the successful rate and accuracy of automatic matching.

A method 200" for determining a charging device that is being physically engaged with a vehicle in interest according to a further exemplary embodiment of the disclosure is proposed. The steps of the method 200" that are same with the steps of the method 200' shown in FIG. 5 are represented by the same reference signs S10, S20, S30', S70, S90 and S120. For these same steps, reference can be made to the description above in conjunction with FIG. 4-FIG. 5. No more details will be elaborated here.

In step S40", not only the number x of the first type of secondary candidate charging devices and the number y of the second type of secondary candidate charging devices are counted, just as in step S40', but also the number z of the third type of primary candidate charging devices is counted. Then in step S50", a sum N=x+y+z is calculated. Next, in step S60", whether the sum N is equal to 1 is determined. If N is exactly equal to 1, it means that the automatic matching succeeds, and the selected only secondary candidate charging device or the only third type of primary candidate charging device is activated (S70). If N is greater than 1 or equal to zero, the automatic matching fails (S90).

It can be seen from the above that, unlike the method 200', the method 200" constantly takes the existence of the third type of charging devices into consideration, thereby ensuring to the greatest extent that the right charging device is automatically activated.

According to an exemplary embodiment of the disclosure, an optional step S15 may be performed between steps S10 and S20: filtering out the charging devices that do not match with the type of the physically engaged charging interface of the vehicle in interest from the primary candidate charging devices, and performing the subsequent screening step S30' based on the primary candidate charging devices remained after filtering. For example, if the engaged charging interface of the vehicle in interest is a DC interface, AC charging devices in the primary candidate charging devices are filtered out; conversely, if the engaged charging interface of the vehicle in interest is an AC interface, DC charging devices in the primary candidate charging devices are filtered out. To this end, the vehicle-side device in the vehicle in interest may send the type of the engaged charging interface along with the current geographic location to the server 4 in step S11. In this way, the amount of calculation for subsequent screening can be effectively reduced.

Additionally or alternatively, the above-described step S30' or S100' may include: from the third type of the at least one primary candidate charging device, filtering out the charging devices whose latest history status before the time stamp is the charging status, in particular selecting the charging devices whose latest history status is the available status, so as to form a third type of secondary candidate charging devices. Correspondingly, the subsequently counted number z should be the number of the thereby screened third type of secondary candidate charging devices.

Additionally or alternatively, a further optional step may be performed between steps S10 and S20: from the at least one primary candidate charging device, filtering out the charging devices whose latest history status is the charging status, in particular selecting the charging devices whose latest history status is the available status, so as to form a basis for the subsequent screening.

Additionally, after the selected only charging device is activated (that is, after S70), a posterior procedure 300 is optionally executed. The posterior procedure 300 comprises: in step S3200, confirming whether the start of charging is detected at a side of the vehicle. If it is confirmed that the start of charging has been detected at the side of the vehicle, then in step S3500, continuing to performing the charging process. On the contrary, if the start of charging has not been detected at the side of the vehicle, it means that a wrong charging device may have been activated or the activated charging device currently stops or suspends service. In this case, the activated charging device is stopped in step S3400, and meanwhile the above step S90 is implemented.

In an example, step S3200 includes: at the same time or shortly after instructing the automatically matched charging device to activate, the server 4 sending an instruction to the vehicle-side device 2 to request it to detect whether the charging process has actually started. The vehicle-side device 2 performs detection in response to the instruction. If the vehicle-side device 2 confirms that the charging process has started, it continues to perform the charging process; otherwise, it reports for example in the form of an error code to the server 4 that no charging current has been received, and then the server 4 sends an instruction to stop the charging process of the automatically activated charging device to the charging device-side device 3 in response to the report. Then, the automatically matched charging device is stopped from the charging operation.

In another example, step S3200 may be performed as follows: presetting the vehicle-side device 2 to send a signal of charge starting to the server 4 once charging is detected, and performing step S90 if the signal of charge starting is not received by the server 4 after instructing the automatically matched charging device to activate (S70) or requesting the side of vehicle to detect whether the charging process has actually started (S3100).

A method 200''' for matching a vehicle and a charging pile according to an exemplary embodiment of the disclosure is proposed.

When the user inserts a charging connector of the charging pile into the vehicle, the vehicle sends a current vehicle location (such as a GPS location of the vehicle) and a time stamp information corresponding to a point-in-time when the charging connector is inserted into the vehicle to a charging control platform of a cloud.

After receiving the vehicle location and the time stamp information, the charging control platform scans a status of all charging piles whose distance to the vehicle location is less than a predetermined threshold (for example, within 800 meters of the vehicle location).

When scanning the charging pile, the charging control platform searches for charging piles whose working status is changed from an available status to an occupied but not charging status at the point-in-time corresponding to the time stamp.

If the charging control platform finds out through scanning that there is only one charging pile that meets the condition, it is deemed that the vehicle is successfully matched with the charging pile, and the charging pile is controlled to start charging the vehicle.

If no charging pile whose working status is changed from an available status to an occupied but not charging status at the point-in-time corresponding to the time stamp is found through the scanning, or multiple charging piles whose working status is changed from an available status to an occupied but not charging status at the point-in-time corresponding to the time stamp are found through the scanning, then it is deemed that the matching failed.

The unsuccessful matching may be due to the following reasons:

- at the point-in-time corresponding to the time stamp, accidentally there are two charging piles with the same status change;
- the number of charging piles to be scanned exceeds the maximum number;
- inaccurate GPS location causes the distance between a target charging pile and the vehicle location to be out of the range of the set threshold.

After the match failed, the user of the vehicle may be notified to scan the two-dimensional code to charge. In another embodiment, the user may be provided with a list of all charging piles around the vehicle through a human-computer interaction interface of the vehicle or a smart phone (for example, through an APP interface of the smart phone), so that the user can select the charging pile that is charging the vehicle.

In this disclosure, the vehicle and the charging pile are matched according to the current vehicle location and the time stamp information corresponding to the point-in-time when the charging connector is inserted into the vehicle, which enables the user of the vehicle to complete the charging without the need of scanning the two-dimensional code of the charging pile, simplifies the active operations of the user during the charging process, and saves the time required for charging preparation.

In addition, although the user is notified by the vehicle-side device in the case of an automatic matching failure, the server 4 may alternatively push a signal of automatic matching failure to a mobile terminal and notify the user via the mobile terminal.

In an example according to the disclosure, digital or physical tags may be provided to the charging devices supporting the "plug and charge" methods 200, 200', 200" and 200'" according to the disclosure, so as to allow, for example, an easy identification of these charging devices when the user queries online (for example, searching for the location of charging piles via a mobile phone APP or vehicle-mounted system) or on-site.

According to the disclosure, an automatic charging process of "plug and charge" is achieved, without the need of manually matching the vehicle and the charging device.

Although some embodiments have been described, these embodiments are presented only by way of examples, and are not intended to limit the scope of the disclosure. The appended claims and equivalents thereof are intended to cover all modifications, substitutions and alterations that fall within the scope and spirit of the disclosure.

The invention claimed is:

1. A method for matching a vehicle and a charging pile, comprising the steps of:

a) when a user of the vehicle inserts a charging connector of the charging pile into the vehicle, the vehicle sends, to a charging control platform of a cloud, a vehicle location and time stamp information corresponding to a point-in-time when the charging connector is inserted into the vehicle; and b) the charging control platform, after receiving the vehicle location and the time stamp information, scans a status of all charging piles whose distance to the vehicle location is less than a predetermined threshold, and when it is found through the scan that there was one and only charging pile whose working status is changed from an available status to an occupied but not charging status at the point-in-time, then the vehicle is successfully matched with the charging pile and the charging pile is controlled to start charging the vehicle.

2. The method according to claim 1, wherein when it is found through the scan that there is no or multiple charging piles whose working status is changed from the available status to the occupied but not charging status at the point-in-time, then the matching failed.

3. The method according to claim 2, wherein after the matching failed, the user is provided with a list of all charging piles around the vehicle through a human-computer interaction interface of the vehicle or a smart phone so that the user can select the charging pile that is charging the vehicle.

4. The method according to claim 1, wherein, after the charging pile is controlled to start charging the vehicle, or after the screened charging devices are activated, a posterior procedure is executed which comprises the steps of:

c) confirming whether the start of charging is detected at a side of the vehicle; and when not, stopping the charging process of the activated charging pile or charging device.

5. The method according to claim 4, wherein, when it failed to match or to determine the charging device that is being physically engaged with the vehicle in interest and/or the activated charging device is stopped in step c), the user is notified that the automatic matching failed and a manual matching is required to start the charging process.

6. The method according to claim 1, wherein a time when a server receives a current geographic location from a vehicle-side device is taken as the point-in-time.

7. An apparatus for determining a charging device that is being physically engaged with a vehicle in interest, comprising:

a processor and a computer-readable storage medium communicatively connected with the processor, wherein a computer program is stored in the computer-readable storage medium and wherein when the computer program is executed by the processor, the method according to claim 1 is performed;

wherein the apparatus is configured as a server which is communicatively connected with a vehicle-side device and a charging device-side device and wherein the server is configured to determine, based on the history information of the charging devices, ability levels of the charging devices in expressing that the charging devices are in the status of being physically engaged but not activated to charge, and the determined ability levels are stored as an attribute assigned to the respective charging devices.

8. The apparatus according to claim 7, wherein the vehicle-side device is configured to send the current geographic location of the vehicle to the apparatus upon the vehicle being physically engaged with the charging device.

9. The apparatus according to claim 7, wherein the charging device-side device is configured to send a real-time operating status of the charging device to the apparatus, wherein the real-time operating status comprises an available status, a charging status, and a status of being physically engaged but not activated to charge.

* * * * *